(12) United States Patent
Roth et al.

(10) Patent No.: US 8,962,717 B2
(45) Date of Patent: Feb. 24, 2015

(54) LONG-FIBER-REINFORCED FLAME-RETARDANT POLYESTERS

(71) Applicant: BASF SE, Ludwigshafen (DE)

(72) Inventors: Michael Roth, Lautertal (DE); Klaus Uske, Bad Dürkheim (DE); Ulli Wolf, Worms (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/969,743

(22) Filed: Aug. 19, 2013

(65) Prior Publication Data

US 2014/0051786 A1    Feb. 20, 2014

Related U.S. Application Data

(60) Provisional application No. 61/684,828, filed on Aug. 20, 2012.

(51) Int. Cl.
| | |
|---|---|
| C08K 13/04 | (2006.01) |
| C08K 5/34 | (2006.01) |
| C08K 3/32 | (2006.01) |
| C08K 5/3492 | (2006.01) |
| C08K 5/5313 | (2006.01) |
| C08K 7/14 | (2006.01) |

(52) U.S. Cl.
CPC . C08K 13/04 (2013.01); C08K 3/32 (2013.01); C08K 5/34924 (2013.01); C08K 5/5313 (2013.01); C08K 7/14 (2013.01)
USPC ............. 524/91; 524/100; 524/101; 524/104; 524/414

(58) Field of Classification Search
CPC ...... C08K 13/04; C08K 3/32; C08K 5/34924; C08K 5/4313; C08K 7/14
USPC ............................ 524/91, 100, 101, 104, 414
See application file for complete search history.

(56) References Cited

U.S. PATENT DOCUMENTS

| | | | |
|---|---|---|---|
| 3,651,014 A | 3/1972 | Witsiepe | |
| 4,269,964 A | 5/1981 | Freitag et al. | |
| 4,584,360 A | 4/1986 | Paul et al. | |
| 4,659,757 A * | 4/1987 | Okamoto et al. | 523/436 |
| 4,732,949 A | 3/1988 | Paul et al. | |
| 5,326,805 A | 7/1994 | Sicken et al. | |
| 6,365,071 B1 * | 4/2002 | Jenewein et al. | 252/609 |
| 6,503,969 B1 | 1/2003 | Klatt et al. | |
| 2001/0005745 A1 | 6/2001 | Kersjes et al. | |
| 2006/0138391 A1 * | 6/2006 | Drewes et al. | 252/601 |
| 2006/0183835 A1 | 8/2006 | Hoerold et al. | |
| 2007/0117910 A1 | 5/2007 | Rexin et al. | |
| 2007/0123632 A1 | 5/2007 | Rexin et al. | |
| 2009/0081462 A1 * | 3/2009 | Miyoshi et al. | 428/407 |
| 2012/0029122 A1 * | 2/2012 | Xue et al. | 524/100 |

FOREIGN PATENT DOCUMENTS

| | | |
|---|---|---|
| DE | 2842005 A1 | 4/1980 |
| DE | 3334782 A1 | 10/1984 |
| DE | 35 06 472 A1 | 8/1986 |
| DE | 19614424 A1 | 10/1997 |
| EP | 0365916 A1 | 5/1990 |
| EP | 584567 A2 | 3/1994 |
| EP | 0711810 A1 | 5/1996 |
| EP | 0 955 333 A2 | 11/1999 |
| EP | 1084181 A1 | 3/2001 |
| EP | 1095030 A1 | 5/2001 |
| EP | 1626066 A1 | 2/2006 |
| EP | 1788027 A1 | 5/2007 |
| EP | 1788028 A1 | 5/2007 |
| EP | 1788029 A1 | 5/2007 |
| WO | WO-02/28953 A1 | 4/2002 |
| WO | WO-2005121232 A1 | 12/2005 |
| WO | WO-2012/016927 A1 | 2/2012 |

OTHER PUBLICATIONS

International Search Report for PCT/EP2013/066709 dated Sep. 4, 2013.
European Search Report for European Patent Office No. 12181019.6-1302 dated Feb. 5, 2013.

* cited by examiner

*Primary Examiner* — Kriellion Sanders
(74) *Attorney, Agent, or Firm* — Drinker Biddle & Reath LLP

(57) ABSTRACT

Thermoplastic molding compositions comprising
- A) from 10 to 93% by weight of a thermoplastic polyester
- B) from 1 to 20% by weight of a phosphinic salt
- C) from 1 to 20% by weight of a nitrogen-containing flame retardant
- D) from 5 to 50% by weight of a long-fiber reinforcing material with fiber length from 2 to 25 mm and L/D ratio from 500 to 4000
- E) from 0 to 50% by weight of other additives,
  where the total of the percentages by weight of components A) to E) is 100%.

6 Claims, No Drawings

LONG-FIBER-REINFORCED FLAME-RETARDANT POLYESTERS

CROSS-REFERENCE TO RELATED APPLICATIONS

This application claims the benefit of U.S. Provisional Application 61/684,828, filed Aug. 20, 2012, which is incorporated herein by reference.

The invention relates to thermoplastic molding compositions comprising
- A) from 10 to 93% by weight of a thermoplastic polyester
- B) from 1 to 20% by weight of a phosphinic salt
- C) from 1 to 20% by weight of a nitrogen-containing flame retardant
- D) from 5 to 50% by weight of a long-fiber reinforcing material with fiber length from 2 to 25 mm and L/D ratio from 500 to 4000
- E) from 0 to 50% by weight of other additives,
  where the total of the percentages by weight of components A) to E) is 100%.

The invention further relates to the use of the thermoplastic molding compositions for producing long-fiber-reinforced pelletized materials, and to the resultant pelletized materials. The invention further relates to the use of pelletized materials of this type for producing notched-impact-resistant flame-retardant moldings of any type, and to the resultant moldings.

Processes for producing long-fiber-reinforced molding compositions and pelletized materials are known by way of example from EP-A 1788027 and 1788028, and also 1788029.

A process which has proven particularly successful for producing long-fiber-reinforced thermoplastics (LFTs) is that known as pultrusion. In this process, the continuous fiber strand (roving) is completely saturated with the polymer melt and then cooled and chopped. The elongate long-fiber-reinforced pelletized material thus produced can be further processed to give moldings by the usual processing methods.

Thermoplastic polyesters are materials with a long history of use. Properties such as flame retardancy and high glow wire resistance are increasingly gaining importance, alongside the mechanical, thermal, electrical, and chemical properties of these materials. Examples here are applications in the household-goods sector (e.g. plugs) and in the electronics sector (e.g. protective covers for circuit breakers).

The market is moreover increasingly interested in thermoplastic polyesters rendered flame-retardant without the use of halogens. The essential requirements placed upon the flame retardant here are pale intrinsic color, adequate thermal stability during polymer processing, and also effective flame retardancy in the reinforced and unreinforced polymer.

The effectiveness of halogen-free flame retardant additive mixtures composed of phosphinates and nitrogen-containing synergists, or reaction products of melamine with phosphoric acid (melamine polyphosphate) is in essence described via UL 94-V fire tests, see EPA 142 3260, EP-A 1084181.

However, for certain applications of flame-retardant polyester molding compositions in the household-equipment sector it is the IEC 60695-2-13 glow-wire test that is primarily of importance, and many polyester molding compositions rendered flame retardant without the use of halogens do not pass this test—examples being those described in EP-A 162 6066 and WO 2005/121232.

It was therefore an object of the present invention, starting from the prior art described above, to provide polyester molding compositions which are rendered flame retardant without use of halogens and which have high flame retardancy and high glow wire resistance.

Surprisingly, it has now been found that long-glass-fiber-reinforced polyester molding compositions based on phosphinates and on nitrogen-containing synergists rendered flame retardant without use of halogens comply with the properties demanded and also provide improved notched-impact resistance.

The molding compositions defined in the introduction have accordingly been found. Preferred embodiments are given in the dependent claims.

The molding compositions of the invention comprise, as component (A), from 10 to 93% by weight, preferably from 35 to 93% by weight, and in particular from 35 to 89% by weight, of at least one thermoplastic polyester.

Use is generally made of polyesters A) based on aromatic dicarboxylic acids and on an aliphatic or aromatic dihydroxy compound.

A first group of preferred polyesters is that of polyalkylene terephthalates, in particular those having from 2 to 10 carbon atoms in the alcohol moiety.

Polyalkylene terephthalates of this type are known per se and are described in the literature. Their main chain contains an aromatic ring which derives from the aromatic dicarboxylic acid. There may also be substitution in the aromatic ring, e.g. by halogen, such as chlorine or bromine, or by $C_1$-$C_4$-alkyl groups, such as methyl, ethyl, iso- or n-propyl, or n-, iso- or tert-butyl groups.

These polyalkylene terephthalates may be prepared by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The intrinsic viscosity of the polyesters (A) is generally in the range from 50 to 220, preferably from 80 to 160 (measured in 0.5% strength by weight solution in a phenol/o-dichlorobenzene mixture in a ratio by weight of 1:1 at 25° C.) in accordance with ISO 1628. Particular preference is given to polyesters whose carboxyl end group content is up to 100 mval/kg of polyester, preferably up to 50 mval/kg of polyester and in particular up to 40 mval/kg of polyester. Polyesters of this type may be prepared, for example, by the process of DE-A 44 01 055. The carboxyl end group content is usually determined by titration methods (e.g. potentiometry).

Particularly preferred molding compositions comprise, as component A), a mixture of polyesters other than PBT, for example polyethylene terephthalate (PET). The proportion of the polyethylene terephthalate, for example, in the mixture is preferably up to 50% by weight, in particular from 10 to 35% by weight, based on 100% by weight of A).

It is also advantageous to use recycled PET materials (also termed scrap PET), optionally mixed with polyalkylene terephthalates, such as PBT.

Recyclates are generally:
1) those known as post-industrial recyclates: these are production wastes during polycondensation or during processing, e.g. sprues from injection molding, start-up material from injection molding or extrusion, or edge trims from extruded sheets or films.
2) post-consumer recyclates: these are plastic items which are collected and treated after utilization by the end consumer. Blow-molded PET bottles for mineral water, soft drinks and juices are easily the predominant items in terms of quantity.

Both types of recyclate may be used either in the form of regrind or in the form of pelletized materials. In the latter case, the crude recyclates are separated and purified and then melted and pelletized using an extruder. This usually facilitates handling and free flow, and metering for further steps in processing.

The recyclates used may either be pelletized or in the form of regrind. The edge length should not be more than 10 mm, preferably less than 8 mm.

Because polyesters undergo hydrolytic cleavage during processing (due to traces of moisture) it is advisable to predry the recyclate. The residual moisture content after drying is preferably <0.2%, in particular <0.05%.

Another group to be mentioned is that of fully aromatic polyesters deriving from aromatic dicarboxylic acids and aromatic dihydroxy compounds.

Suitable aromatic dicarboxylic acids are the compounds previously mentioned for the polyalkylene terephthalates. The mixtures preferably used are composed of from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the general formula

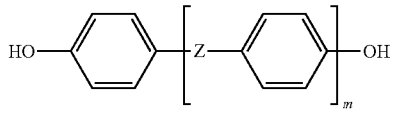

where Z is an alkylene or cycloalkylene group having up to 8 carbon atoms, an arylene group having up to 12 carbon atoms, a carbonyl group, a sulfonyl group, an oxygen atom, or a sulfur atom, or a chemical bond, and m is from 0 to 2. The phenylene group of the compounds may also have substitution by $C_1$-$C_6$-alkyl or alkoxy groups, and fluorine, chlorine or bromine.

Examples of parent compounds for these compounds are
dihydroxybiphenyl,
di(hydroxyphenyl)alkane,
di(hydroxyphenyl)cycloalkane,
di(hydroxyphenyl)sulfide,
di(hydroxyphenyl)ether,
di(hydroxyphenyl)ketone,
di(hydroxyphenyl)sulfoxide,
α,α'-di(hydroxyphenyl)dialkylbenzene,
di(hydroxyphenyl)sulfone, di(hydroxybenzoyl)benzene, resorcinol, and hydroquinone, and also the ring-alkylated and ring-halogenated derivatives of these.

Among these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane,
and in particular to
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone, and
2,2-di(3',5'-dimethyl-4'-hydroxyphenyl)propane
and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

According to the invention, polyesters also include halogen-free polycarbonates. Examples of suitable halogen-free polycarbonates are those based on diphenols of the general formula

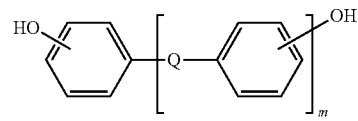

where Q is a single bond, a $C_1$-$C_8$-alkylene group, a $C_2$-$C_3$-alkylidene group, a $C_3$-$C_6$-cycloalkylidene group, a $C_6$-$C_{12}$-arylene group, or —O—, —S— or —SO$_2$—, and m is a whole number from 0 to 2.

The phenylene radicals of the diphenols may also have substituents, such as $C_1$-$C_6$-alkyl or $C_1$-$C_6$-alkoxy.

Examples of preferred diphenols of the formula are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl)propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

Suitable polycarbonates may be branched in a known manner, specifically and preferably by incorporating 0.05 to 2.0 mol %, based on the total of the diphenols used, of at least trifunctional compounds, for example those having three or more phenolic OH groups.

Polycarbonates which have proven particularly suitable have relative viscosities $\eta_{rel}$ of from 1.10 to 1.50, in particular from 1.25 to 1.40. This corresponds to average molar masses $M_w$ (weight-average) of from 10 000 to 200 000 g/mol, preferably from 20 000 to 80 000 g/mol.

The diphenols of the general formula are known per se or can be prepared by known processes.

The polycarbonates may, for example, be prepared by reacting the diphenols with phosgene in the interfacial process, or with phosgene in the homogeneous-phase process (known as the pyridine process), and in each case the desired molecular weight is achieved in a known manner by using an appropriate amount of known chain terminators. (In relation to polydiorganosiloxane-containing polycarbonates see, for example, DE-A 33 34 782.)

Examples of suitable chain terminators are phenol, p-tert-butylphenol, or else long-chain alkylphenols, such as 4-(1,3-tetramethylbutyl)phenol as in DE-A 28 42 005, or monoalkylphenols, or dialkylphenols with a total of from 8 to 20 carbon atoms in the alkyl substituents as in DE-A35 06 472, such as p-nonylphenol, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates composed of halogen-free diphenols, of halogen-free chain terminators and optionally of halogen-free branching agents, where the content of subordinate amounts at the ppm level of hydrolyzable chlorine, resulting, for example, from the preparation of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components A) which may be mentioned are amorphous polyester carbonates, where during the preparation process phosgene has been replaced by aromatic dicarboxylic acid units, such as isophthalic acid and/or terephthalic acid units. Reference may be made at this point to EP-A 711 810 for further details.

EP-A 365 916 describes other suitable copolycarbonates having cycloalkyl radicals as monomer units.

It is also possible for bisphenol A to be replaced by bisphenol TMC. Polycarbonates of this type are obtainable from Bayer with the trademark APEC HT®.

The molding compositions of the invention comprise, as component B), from 1 to 20% by weight, preferably from 1 to 15% by weight, and in particular from 5 to 15% by weight, based on A) to E), of a phosphinic salt.

A suitable component B) is phosphinic salts of the formula (I) or/and diphosphinic salts of the formula (II), or polymers of these

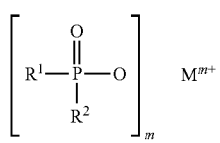
(I)

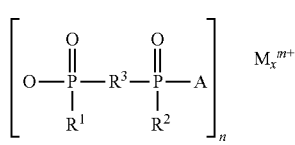
(II)

in which
R$^1$ and R$^2$ are identical or different and are hydrogen, C$_1$-C$_6$-alkyl, linear or branched, and/or aryl;

R$^3$ is C$_1$-C$_{10}$-alkylene, linear or branched, C$_6$-C$_{10}$-arylene, -alkylarylene, or -arylalkylene;

M is Mg, Ca, Al, Sb, Sn, Ge, Ti, Zn, Fe, Zr, Ce, Bi, Sr, Mn, Li, Na, K, and/or a protonated nitrogen base;

m is from 1 to 4; n is from 1 to 4; x is from 1 to 4, preferably m=3, x=3.

It is preferable that R$^1$ and R$^2$ of component B are identical or different and are methyl, ethyl, n-propyl, isopropyl, n-butyl, tert-butyl, n-pentyl and/or phenyl.

It is preferable that R$^3$ of component B is methylene, ethylene, n-propylene, isopropylene, n-butylene, tert-butylene, n-pentylene, n-octylene, or n-dodecylene, phenylene, or naphthylene; methylphenylene, ethylphenylene, tert-butylphenylene, methylnaphthylene, ethylnaphthylene, or tert-butylnaphthylene; phenylmethylene, phenylethylene, phenylpropylene or phenylbutylene.

It is particularly preferable that R$^1$ and R$^2$ are hydrogen, methyl or ethyl, and that M=Al, particular preference being given to Al hypophosphite.

The phosphinates are preferably produced via precipitation of the corresponding metal salts from aqueous solutions. However, it is also possible to precipitate the phosphinates in the presence of a suitable inorganic metal oxide or metal sulfide as carrier material (white pigments, examples being TiO$_2$, SnO$_2$, ZnO, ZnS, SiO$_2$). This method gives surface-modified pigments which can be used as laser-markable flame retardants for thermoplastic polyesters.

The molding compositions of the invention comprise, as component C), from 1 to 20% by weight, preferably from 1 to 15% by weight, and in particular from 5 to 15% by weight, of a nitrogen-containing flame retardant, preferably a melamine compound.

Melamine cyanurate is preferably suitable in the invention (component C) and is a reaction product of preferably equimolar amounts of melamine (formula I) and cyanuric acid or isocyanuric acid (formulae Ia and Ib)

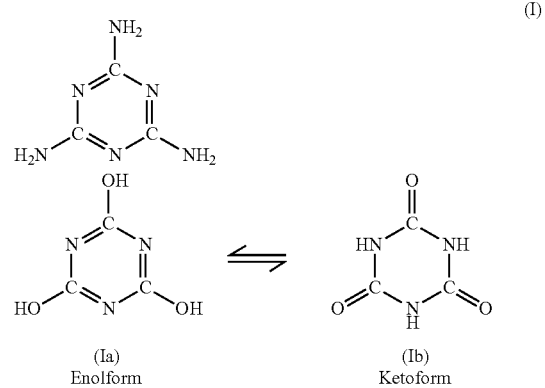

(Ia) Enolform    (Ib) Ketoform

It is obtained by way of example via reaction of aqueous solutions of the starting compounds at from 90 to 100° C. The product available commercially is a white powder with an average grain size d$_{50}$ of from 1.5 to 7 μm and with a d$_{99}$ value smaller than 50 μm.

Other suitable compounds (often also termed salts or adducts) are melamine sulfate, melamine, melamine borate, melamine oxalate, melamine phosphate prim., melamine phosphate sec., and melamine pyrophosphate sec., melamine neopentyl glycol borate, and also melamine phosphate (CAS No. 56386-64-2 or 218768-84-4).

Preference is given to melamine polyphosphate salts derived from a 1,3,5-triazine compound of which the number n representing the average degree of condensation is from 20 to 200, and the 1,3,5-triazine content per mole of phosphorus atom is from 1.1 to 2.0 mol of a 1,3,5-triazine compound selected from the group consisting of melamine, melam, melem, melon, ammeline, ammelide, 2-ureidomelamine, acetoguanamine, benzoguanamine, and diaminophenyltriazine. It is preferable that the n value of these salts is generally from 40 to 150, and that the molar ratio of a 1,3,5-triazine compound to phosphorus atom is from 1.2 to 1.8. The pH of a 10% by weight aqueous slurry of salts produced as in EP-B1095030 is moreover generally more than 4.5 and preferably at least 5.0. The pH is usually determined by placing 25 g of the salt and 225 g of pure water at 25° C. in a 300 ml beaker, stirring the resultant aqueous slurry for 30 minutes, and then measuring the pH. The abovementioned n value, the number-average degree of condensation, can be determined by means of $^{31}P$ solid-state NMR. J. R. van Wazer, C. F. Callis, J. Shoolery and R. Jones, J. Am. Chem. Soc., 78, 5715, 1956 disclose that the number of adjacent phosphate groups is given by a unique chemical shift which permits clear distinction between orthophosphates, pyrophosphates, and polyphosphates. EP1095030B1 moreover describes a process for producing the desired polyphosphate salt of a 1,3,5-triazine compound which has an n value of from 20 to 200, where the 1,3,5-triazine content of said salt is from 1.1 to 2.0 mol of a 1,3,5-triazine compound. Said process comprises conversion of a 1,3,5-triazine compound into its orthophosphate salt by orthophosphoric acid, followed by dehydration and heat treatment in order to convert the orthophosphate salt into a polyphosphate of the 1,3,5-triazine compound. Said heat treatment is preferably carried out at a temperature of at least 300° C., and preferably at at least 310° C. In addition to orthophosphates of 1,3,5-triazine compounds, it is equally possible to use other 1,3,5-triazine phosphates, inclusive of, for example, a mixture of orthophosphates and of pyrophosphates.

Suitable guanidine salts are

|  | CAS No. |
|---|---|
| G carbonate | 593-85-1 |
| G cyanurate prim. | 70285-19-7 |
| G phosphate prim. | 5423-22-3 |
| G phosphate sec. | 5423-23-4 |
| G sulfate prim. | 646-34-4 |
| G sulfate sec. | 594-14-9 |
| Guanidine pentaerythritol borate | N.A. |
| Guanidine neopentyl glycol borate | N.A. |
| and also urea phosphate green | 4861-19-2 |
| Urea cyanurate | 57517-11-0 |
| Ammeline | 645-92-1 |
| Ammelide | 645-93-2 |
| Melem | 1502-47-2 |
| Melon | 32518-77-7 |

For the purposes of the present invention the compounds include, for example, benzoguanamine itself and its adducts or salts, and also the derivatives substituted on nitrogen and their adducts or salts.

Other suitable compounds are ammonium polyphosphate $(NH_4PO_3)_n$, where n is about 200 to 1000, preferably from 600 to 800, and tris(hydroxyethyl)isocyanurate (THEIC) of the formula IV

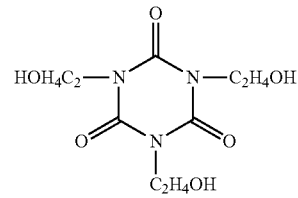

(IV)

or its reaction products with aromatic carboxylic acids $Ar(COOH)_m$, optionally in mixtures with one another, where Ar is a mono-, bi-, or trinuclear aromatic six-membered ring system, and m is 2, 3, or 4.

Examples of suitable carboxylic acids are phthalic acid, isophthalic acid, terephthalic acid, 1,3,5-benzenetricarboxylic acid, 1,2,4-benzenetricarboxylic acid, pyromellitic acid, mellophanic acid, prehnitic acid, 1-naphthoic acid, 2-naphthoic acid, naphthalenedicarboxylic acids, and anthracenecarboxylic acids.

They are produced by reacting the tris(hydroxyethyl)isocyanurate with the acids, or with their alkyl esters or their halides in accordance with the processes in EP-A 584 567.

Reaction products of this type are a mixture of monomeric and oligomeric esters which may also have crosslinking. The degree of oligomerization is usually from 2 to about 100, preferably from 2 to 20. Preference is given to the use of THEIC and/or its reaction products in mixtures with phosphorus-containing nitrogen compounds, in particular $(NH_4PO_3)_n$ or melamine pyrophosphate or polymeric melamine phosphate. The mixing ratio, for example of $(NH_4PO_3)_n$ to THEIC, is preferably 90-50:10-50% by weight, in particular 80-50:50-20% by weight, based on the mixture of components B1) of this type.

Other suitable compounds are benzoguanamines of the formula V (V)

where R and R' are straight-chain or branched alkyl radicals having from 1 to 10 carbon atoms, preferably hydrogen and in particular their adducts with phosphoric acid, boric acid and/or pyrophosphoric acid.

Preference is also given to allantoin compounds of the formula VI (VI)

where R and R' are as defined in formula V, and also to the salts of these with phosphoric acid, boric acid and/or pyrophosphoric acid, and also to glycolurils of the formula VII and to their salts with the abovementioned acids

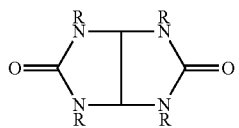

where R is as defined in formula V.

Suitable products are obtainable commercially or in accordance with DE-A 196 14 424.

The cyanoguanidine (formula VIII) which can be used according to the invention is obtained, for example, by reacting calcium cyanamide with carbonic acid, whereupon the cyanamide produced dimerizes at a pH of from 9 to 10 to give cyanoguanidine.

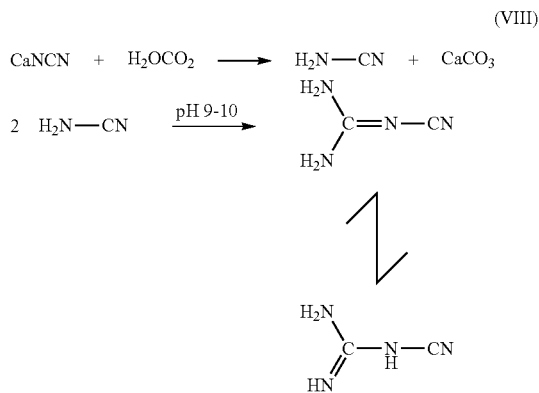

The product obtainable commercially is a white powder with a melting point of from 209° C. to 211° C.

It is preferable that the ratio of component B) to component C) is from 1:1 to 5:1, in particular from 1:1.5 to 1:2.5.

It is very particularly preferable in the invention to use melamine cyanurate having the following particle size distribution:

$d_{98}$<25 ∞m, preferably <20 µm
$d_{50}$<4.5 µm, preferably <3 µm.

The person skilled in the art generally understands a $d_{50}$ value to be the particle size value which is smaller than that of 50% of the particles and larger than that of 50% of the particles.

The particle size distribution is usually determined via laser scattering (by analogy with ISO 13320).

The amounts used of the long-fiber fillers. D) are from 5 to 50% by weight, in particular from 5 to 40% by weight, the fiber length of these being from 2 to 25 mm, preferably from 3 to 15 mm, and the L/D (length/diameter) ratio of these being from 500 to 4000, in particular from 500 to 2000, and very particularly from 500 to 700.

Preferred fibrous fillers that may be mentioned are carbon fibers, aramid fibers, glass fibers, and potassium titanate fibers, particular preference being given here to glass fibers in the form of E glass. These are used in the form of rovings in the forms commercially available.

The diameter of the glass fibers used in the form of rovings in the invention is from 6 to 20 µm, preferably from 10 to 18 µm, and the cross section of the glass fibers here is round, oval, or angular. In particular, E glass fibers are used in the invention. However, it is also possible to use any other type of glass fiber, examples being A, C, D, M, S, and R glass fibers, or any desired mixture thereof, or a mixture with E glass fibers.

In order to improve compatibility with the thermoplastic, the fibrous fillers can have been surface-pretreated with a silane compound.

Suitable silane compounds are those of the general formula

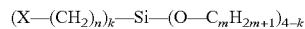

in which the definitions of the substituents are as follows:

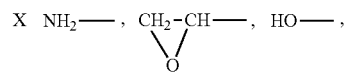

n is an integer from 2 to 10, preferably from 3 to 4
m is an integer from 1 to 5, preferably from 1 to 2
k is an integer from 1 to 3, preferably from 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as substituent X.

The amounts generally used for surface coating of the silane compounds are from 0.01 to 2% by weight, preferably from 0.025 to 1.0% by weight, and in particular from 0.05 to 0.5% by weight (based on D).

Other suitable coating agents (also termed size) are based on isocyanates, on phenolic resins, or on acrylic acid derivatives.

The thermoplastic molding compositions of the invention can moreover comprise, as component E), other additives which differ from A) to D).

The molding compositions of the invention can comprise, as component E), a total of from 0 to 50% by weight, in particular up to 30% by weight, based on the total amount of components A) to E), of other additives and processing aids.

The thermoplastic molding compositions advantageously comprise a lubricant. The molding compositions of the invention can comprise, as component E), from 0 to 3% by weight, preferably from 0.05 to 3% by weight, with preference from 0.1 to 1.5% by weight, and in particular from 0.1 to 1% by weight, based on the total amount of components A) to E), of a lubricant.

Preference is given to the Al, alkali metal, or alkaline earth metal salts, or esters or amides of fatty acids having from 10 to 44 carbon atoms, preferably having from 14 to 44 carbon atoms. The metal ions are preferably alkaline earth metal and Al, particular preference being given here to Ca or Mg. Preferred metal salts are Ca stearate and Ca montanate, and also Al stearate. It is also possible to use a mixture of various salts, in any desired mixing ratio:

The carboxylic acids can be mono- or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be mono- to tetrahydric. Examples of alcohols are n-butanol, n-octanol, stearyl alcohol, ethylene glycol, propylene glycol, neopentyl glycol, and pentaerythritol, preference being given to glycerol and pentaerythritol.

The aliphatic amines can be mono- to tribasic. Examples of these are stearylamine, ethylenediamine, propylenediamine, hexamethylenediamine, and di(6-aminohexyl)amine, particular preference being given here to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use mixtures of various esters or amides, or esters with amides in combination, in any desired mixing ratio.

The thermoplastic molding compositions of the invention can comprise, as other component E), conventional processing aids, such as stabilizers and oxidation retarders, other agents to counteract thermal decomposition and decomposition due to ultraviolet light, lubricants and mold-release agents, colorants, such as dyes and pigments, nucleating agents, plasticizers, and rubbers, etc.

Examples that may be mentioned of oxidation retarders and heat stabilizers are phosphites, sterically hindered phenols, and other amines (e.g. TAD), hydroquinones, various substituted members of these groups, and mixtures thereof, in concentrations up to 1% by weight, based on the weight of the thermoplastic molding compositions.

UV stabilizers that may be mentioned, where the amounts used of these are generally up to 2% by weight, based on the molding composition, are various substituted resorcinols, salicylates, benzotriazoles, and benzophenones.

Colorants that can be added are inorganic pigments, such as titanium dioxide, ultramarine blue, iron oxide, and carbon black and/or graphite, and also organic pigments, such as phthalocyanines, quinacridones, perylenes, and also dyes, such as nigrosin, and anthraquinones.

Nucleating agents that can be used are sodium phenylphosphinate, aluminum oxide, silicon dioxide, and also preferably talc powder.

The thermoplastic molding compositions can comprise, as component E), from 0.01 to 2% by weight, preferably from 0.05 to 1.5% by weight, particularly preferably from 0.1 to 1.5% by weight, based in each case on the total weight of components A) to E), of at least one heat stabilizer.

The polyester molding compositions of the invention can be produced via the known processes for producing elongate long-fiber-reinforced pelletized materials, in particular via pultrusion processes, in which the continuous preheated fiber strand (roving) is drawn at constant velocity through the polymer melt and thereby completely saturated with the polymer melt, and then is cooled down and chopped. The elongate long-fiber-reinforced pelletized material obtained in this way, the pellet length of which is preferably from 2 to 25 mm, in particular from 5 to 14 mm, can be further processed by the conventional processing methods (e.g. injection molding, compression molding) to give moldings.

The preferred L/D ratio of the pelletized material after pultrusion is from 2 to 8, in particular from 3 to 4.5.

The polymer strand produced from molding compositions of the invention can be processed to give pelletized material by any of the known pelletization processes, e.g. via strand pelletization, in which the strand is cooled in a water bath and is then chopped.

Particularly good properties can be achieved in the molding by using non-aggressive processing methods. Non-aggressive in this context means especially substantial avoidance of excessive fiber breakage and of the attendant severe reduction of fiber length. In the case of injection molding, this means that it is preferable to use screws with large diameter and low compression ratio, in particular smaller than 2, and generously dimensioned nozzle channels and feed channels. A supplementary requirement is that high cylinder temperatures are used to achieve rapid melting of the elongate pellets (contact heating), and that the fibers are not excessively comminuted by excessive exposure to shear. If these measures are taken, the invention gives moldings which have a higher average fiber length than comparable moldings produced from short-fiber-reinforced molding compositions. An additional improvement in properties is thus achieved, in particular in tensile modulus of elasticity, ultimate tensile strength, and notched-impact resistance.

Fiber length after processing to give the molding, e.g. via injection molding, is usually from 0.05 to 10 mm, in particular from 0.4 to 2 mm.

The moldings produced from the molding compositions of the invention are used to produce internal and external parts, preferably with a load-bearing or mechanical function, in the following sectors: electrical, furniture, sports, mechanical engineering, sanitary and hygiene, medicine, energy technology and drive technology, automobiles and other conveyances, and casing material for devices and apparatuses for telecommunications, consumer electronics, household appliances, mechanical engineering, or the heating sector, or fastener components for installation work or for containers, and ventilation components of all types.

The moldings of the invention have markedly higher impact resistance, in particular notched-impact resistance; at the same time, they also provide effective flame retardancy, and are glow wire resistant.

Processing Methods

The following processing methods can also be used, alongside the conventional processing methods, such as extrusion or injection molding:

CoBi injection or assembly injection molding for hybrid components, where the polyester molding composition of the invention is combined with other compatible or incompatible materials, e.g. thermoplastics, thermosets, or elastomers.

Insert components, e.g. bearings or screw-thread inserts made of the polyester molding compositions of the invention, overmolded with other compatible or incompatible materials, e.g. thermoplastics, thermosets, or elastomers.

Outsert components, such as frames, casings, or struts made of the polyester molding composition of the invention, into which functional elements made of other compatible or incompatible materials, e.g. thermoplastics, thermosets, or elastomers are injected.

Hybrid components (elements made of the polyester molding composition of the invention combined with other compatible or incompatible materials, e.g. thermoplastics, thermosets, or elastomers), produced via composite injection molding, injection welding, assembly injection molding, ultrasound welding, frictional welding, or laser welding, or adhesive bonding, or beading, or riveting.

Semifinished products and profiles (e.g. produced via extrusion, pultrusion, layering, or lamination).

Surface coating, doubling methods, chemical or physical metallization, or flocking, where the polyester molding composition of the invention can be the substrate itself or the substrate support, or, in the case of hybrid/Bi-injection components, can be a defined substrate region, which can also be brought to the surface via subsequent chemical treatment (e.g. etching) or physical treatment (e.g. machining or laser ablation).

Printing, transfer print, 3-D print, laser inscription.

EXAMPLES

The following components were used:

Component A: Ultradur® B2550 from BASF SE (PBT with intrinsic viscosity of 110 cm$^3$/g in accordance with DIN 53728)

Component B: Aluminum hypophosphite (ex Italmatch Chemicals)

Component C: Melamine cyanurate of average particle size $d_{50}$ of ~2.6 μm (Melapur®MC 25 from BASF SE, $d_{98}$<~25 μm).

Component D/1: 2400 tex glass fiber roving (from 3B) with diameter of 17 μm (tex≙g/km glass fiber).

Component D/2: PPG 3786 short glass fiber (PPG) with diameter of 10 μm and with average fiber length of 4.5 mm.

Component E/1: Luwax® OA5 polyolefin wax (BASF SE)

Component E/2: Pentaerythritol tetrastearate

The molding compositions were produced as follows:

1) Short-fiber-reinforced pelletized materials by means of extrusion and injection molding:

For this, the individual components were mixed in a ZSK 26 twin-screw extruder (Berstorff) at throughput of 20 kg/h and about 240-270° C., with flat temperature profile, discharged in the form of a strand, cooled until pelletizable, and pelletized. The test specimens for the tests presented in Table 1 were injection molded in an Arburg 420C injection molding machine at a melt temperature of about 260° C. and a mold temperature of about 80° C.

2) Long-fiber-reinforced pelletized materials by means of pultrusion process and injection molding:

The individual components A)-C) and E) were mixed at 240° C. in a laterally attached twin-screw extruder and charged at a melt flow rate of 26 kg/h by way of a connecting section to the impregnation chamber, the temperature of which was 255° C. The rovings, preheated to 220° C., were pretensioned in order to prevent contact between the individual glass fibers, and were drawn at a constant velocity of from 6 to 10 m/min through the polymer melt and thus completely saturated with the polymer melt, and were then cooled to about room temperature and chopped into elongate sections of length about 12 mm. The L/D ratio of the resultant elongate long-fiber-reinforced pellets was about 700.

The test specimens for the tests presented in Table 1 were injection molded in an Arburg 420C injection molding machine at a melt temperature of about 260° C. and a mold temperature of about 80° C.

The test specimens for the tensile stress tests were produced in accordance with ISO 527-2:/1993, and the test specimens for the impact resistance measurements were produced in accordance with ISO 179-2/1 eA.

The flame retardancy of the molding compositions was firstly determined by the UL 94V (Underwriters Laboratories Inc. Standard of Safety, "Test for Flammability of Plastic Materials for Parts in Devices and Appliances", pages 14 to 18, Northbrook 1998).

Glow wire resistance was determined by the glow wire ignition test in the form of GWIT (Glow Wire Ignition Temperature) in accordance with DIN EN 60695-2-13, and GWFI (Glow Wire Flammability Index) was determined in accordance with DIN EN 60695-2-12. In the GWIT test, a glowing wire at temperatures of from 550 to 960° C. is used on 3 test specimens (for example plaques measuring 60×60×1.5 mm) to determine the maximum temperature which, in 3 successive tests, does not lead to ignition, even during the period of exposure to the glow wire. The glow wire ignition temperature stated is 25K above the maximum temperature determined. The ignition criterion used here is a flame burning for periods >5 sec.

The table gives compositions of the molding compositions and results of the tests.

| Components [% by wt] | Comparative example | Inventive example 1 |
|---|---|---|
| A | 54.2 | 54.2 |
| B | 12.6 | 12.6 |
| C | 7.4 | 7.4 |
| D/1 | — | 25 |
| D/2 | 25 | — |
| E/1 + E/2 | 0.3 + 0.5 | 0.3 + 0.5 |
| Tensile modulus of elasticity [MPa] | 10 000 | 10 800 |
| Tensile stress at break [MPa] | 110 | 130 |
| Notched-impact resistance [kJ/m$^2$] | 6.6 | 16.6 |
| UL 94 (1.6 mm) | V-0 | V-0 |
| GWFI 960° C./1.5 mm | passed | passed |
| GWIT 775° C./1.5 mm | not passed | passed |
| GWIT max/1.5 mm | 650° C. | 775° C. |

From the data in the table it is apparent that the composition of the invention has much better glow wire resistance than the prior art (GWIT 775° C. passed). At the same time, it is also apparent that the composition of the invention has much better notched-impact resistance.

The invention claimed is:

1. A method for producing long-fiber-reinforced pelletized materials comprising pultrusion of a thermoplastic molding composition comprising
    A) from 10 to 93% by weight of a thermoplastic polyester
    B) from 1 to 20% by weight of a phosphinic salt
    C) from 1 to 20% by weight of a nitrogen-containing flame retardant
    D) from 5 to 50% by weight of a long-fiber reinforcing material with fiber length from 2 to 25 mm and L/D ratio from 500 to 4000
    E) from 0 to 50% by weight of other additives,
        where the total of the percentages by weight of components A) to E) does not exceed 100%.

2. The method according to claim 1, wherein component A) is a polyalkylene terephthalate.

3. The thermoplastic molding composition method according to claim 1, wherein the ratio of B) to C) is from 1:1 to 5:1.

4. The thermoplastic molding composition method according to claim 1, in which the particle size distribution value $d_{98}$ of component C) is <25 μm.

5. A long-fiber-reinforced pelletized material obtained from the method according to claim 1.

6. A molding obtained from the pelletized materials according to claim 5.

* * * * *